(12) United States Patent
Griffioen (10) Patent No.: US 9,780,540 B2
(45) Date of Patent: Oct. 3, 2017

(54) DUCT ROD SYSTEM FOR INSTALLING AN ELONGATED ELEMENT IN A CONDUIT

(75) Inventor: Willem Griffioen, Ter Aar (NL)

(73) Assignee: PLUMETTAZ HOLDING S.A., Bex (CH)

( * ) Notice: Subject to any disclaimer, the term of this patent is extended or adjusted under 35 U.S.C. 154(b) by 933 days.

(21) Appl. No.: 13/885,626

(22) PCT Filed: Nov. 16, 2011

(86) PCT No.: PCT/EP2011/005771
§ 371 (c)(1),
(2), (4) Date: Jul. 31, 2013

(87) PCT Pub. No.: WO2012/065728
PCT Pub. Date: May 24, 2012

(65) Prior Publication Data
US 2013/0299758 A1    Nov. 14, 2013

(30) Foreign Application Priority Data
Nov. 16, 2010   (CH) .................................. 1922/10

(51) Int. Cl.
*H02G 1/08*   (2006.01)
*H02G 1/00*   (2006.01)

(52) U.S. Cl.
CPC .............. *H02G 1/00* (2013.01); *H02G 1/083* (2013.01)

(58) Field of Classification Search
USPC .................................. 254/134.3 FT, 134.3 R
See application file for complete search history.

(56) References Cited

U.S. PATENT DOCUMENTS

| 1,946,037 | A |   | 2/1934 | Scott |
| 2,930,584 | A | * | 3/1960 | Hensley ................... H02G 1/08 |
|           |   |   |        | 124/57 |
| 3,102,715 | A |   | 9/1963 | Weitzel et al. |
| 3,321,184 | A |   | 5/1967 | Goss |
| 4,569,420 | A |   | 2/1986 | Pickett et al. |
| 4,756,510 | A |   | 7/1988 | Klamm et al. |
| 4,895,221 | A |   | 1/1990 | Carlson |

(Continued)

FOREIGN PATENT DOCUMENTS

| DE | 3220286 A1 | 12/1983 |
| DE | 3220286 A1 | 12/1983 |

(Continued)

OTHER PUBLICATIONS

International Search Report for International Application No. PCT/EP2011/064272 dated Nov. 16, 2012.

(Continued)

*Primary Examiner* — Joseph J Hail
*Assistant Examiner* — Shantese McDonald
(74) *Attorney, Agent, or Firm* — Patterson Thuente Pedersen, P.A.

(57) ABSTRACT

A duct rod system to be pushed in a conduit of a defined configuration for installing an elongated element in the conduit and comprising at least one rod having a flexible main body, the flexible main body having a bending stiffness arrangement defined in relation to the defined configuration of the conduit to permit a friction reduction of the flexible main body in the conduit.

30 Claims, 3 Drawing Sheets

(56) References Cited

U.S. PATENT DOCUMENTS

| | | | |
|---|---|---|---|
| 5,052,660 A * | 10/1991 | Bergman | H02G 1/083 |
| | | | 254/134.3 FT |
| 5,458,317 A | 10/1995 | Caracofe et al. | |
| 5,810,867 A | 9/1998 | Zarbatany et al. | |
| 5,897,103 A | 4/1999 | Griffioen et al. | |
| 5,915,770 A * | 6/1999 | Bergstrom | H02G 1/00 |
| | | | 254/134.3 R |
| 6,030,405 A | 2/2000 | Zarbatany et al. | |
| 6,793,202 B2 | 9/2004 | Pecot et al. | |
| 2004/0180194 A1 | 9/2004 | White | |
| 2005/0184279 A1* | 8/2005 | Diggle, III | H02G 1/083 |
| | | | 254/134.3 FT |
| 2005/0259930 A1 | 11/2005 | Elkins, II et al. | |
| 2006/0219992 A1 | 10/2006 | Fee et al. | |
| 2008/0131592 A1 | 6/2008 | Kummer et al. | |
| 2008/0188793 A1 | 8/2008 | Kozak et al. | |
| 2008/0289181 A1 | 11/2008 | Kozak et al. | |
| 2013/0277629 A1 | 10/2013 | Plumettaz et al. | |

FOREIGN PATENT DOCUMENTS

| | | |
|---|---|---|
| DE | 4038156 A1 | 6/1992 |
| DE | 4107321 A1 | 9/1992 |
| DE | 59 006 513 D1 | 8/1994 |
| EP | 0 437 709 A1 | 7/1991 |
| EP | 0 437 709 B1 | 7/1994 |
| EP | 2 194 625 A2 | 6/2010 |
| FR | 2655782 | 6/1991 |
| FR | 2717959 | 9/1995 |
| JP | 03276104 | 4/1997 |
| JP | 2001028817 | 1/2001 |
| JP | 2001186618 | 7/2001 |
| JP | 2002082268 | 3/2002 |
| JP | 2008537181 A1 | 9/2008 |
| WO | WO2004006421 | 1/2004 |
| WO | WO2004008599 | 1/2004 |
| WO | WO2006115541 A1 | 11/2006 |
| WO | WO 2007/123335 A1 | 11/2007 |
| WO | WO 2008/097547 A2 | 8/2008 |

OTHER PUBLICATIONS

Application and File History for U.S. Appl. No. 13/817,737, filed Jul. 8, 2013, inventor Plumettaz et al.

* cited by examiner

DUCT ROD SYSTEM FOR INSTALLING AN ELONGATED ELEMENT IN A CONDUIT

RELATED APPLICATIONS

The present application is a National Phase entry of PCT Application No. PCT/EP2011/005771, filed Nov. 16, 2011, which claims priority from CH Patent Application No. 01922/10, filed Nov. 16, 2010, which applications are hereby incorporated by reference in their entireties.

TECHNICAL FIELD

The present invention relates to a duct rod system to be pushed in a conduit for fishing or pulling in return an elongated element to be laid in the conduit.

BACKGROUND ART

Standard fishing rods, often called duct rodders, are known for pulling back cables or optical fiber cables to be installed in a long conduit. These rods in general comprise one elongated cylindrical main body or several cylindrical elongated parts to be connected at the required length. The elements are usually unwound from a coil and pushed in the conduit into which the cable will be pulled in return. Since the conduits may present bends or junctions, the elongated parts shall present flexibility to pass these bended portions. The problem linked to the aforementioned flexibility is that the maximum insertion length achievable is limited by undulations of the rod inside the duct. The required force to push the rod inside the conduit increases with the inserted length of the rod. The higher the pushing force, the shorter the induced undulation periods of the rod inside the conduit, leading to increased friction forces, and above a certain critical limit even rendering impossible any further movement of the rod inside the duct.

The pushing force depends on at least two different factors: the friction of the rod due to its weight and induced undulations in the straight portions of the duct and the friction induced by the reaction of the rod in the bends or junctions.

Concerning this friction of the rod, it is possible to reduce it with the use of lubricant or fluid injected in the conduit simultaneously with the rod. These techniques imply using sophisticated machines, increase the time to set up the installation, require the supply of fluid (oil, water or compressed air), leading to an increase of the costs of pushing the rod into the conduit.

Concerning the additional friction forces coming from bends or junctions, some attempts have been carried out to facilitate the introduction of the rod through these obstacles. For example, the document U.S. Pat. No. 4,895,221 discloses a duct rod equipped at its head with a foam saturated with oil. When the head enters a bended portion of the duct, the foam releases its oil and the friction between the duct walls and the rod is reduced. However, this apparatus may not allow passing numerous bends, as the oil saturated in the foam will be released rapidly in the first bends. Another apparatus is disclosed in the document US2004180194A1. This document discloses a duct rod or fish tape with a rolling head. The rolling head helps the rod to pass the bends of the conduit, but it should be noticed that nothing with this apparatus will reduce the pushing force after the head has passed the bend, as the rod will rub against the conduit wall along the bend. Focusing on junctions, EP2194625 discloses a robot designed to help choosing the correct way when the rod head is at a junction. The robot is able to articulate to follow the right way. However, nothing will decrease the required pushing force after the rod head will be introduced in the correct conduit, as, like to the aforementioned situation in the bends with the rolling head, the rod will rub against the wall conduit. All the above mentioned points are limiting the possibility to push a duct rod through long conduits.

SUMMARY OF THE INVENTION

The present invention aims to solve these aforementioned drawbacks and is directed to a duct rod system which enables pushing a rod though a long conduit, even if this conduit comprises numerous bends and/or junctions.

With this goal in mind, a first embodiment of the invention is a duct rod system to be pushed in a conduit of a defined configuration for installing an elongated element in the conduit and comprising at least one rod having a flexible main body, characterized in that the flexible main body has a bending stiffness arrangement defined in relation to the defined configuration of the conduit, to permit a friction reduction of the flexible main body in the conduit. Such a duct rod system allows the maximum pushing length achievable to be increased as the bending stiffness of the main body of the rod is optimized with regard to the specific configuration of the conduit, where the rod should be pushed through. It is understood that the flexible main body of the rod according to embodiments of the present invention does not refer to searching robot heads, rolling heads or flexible foam heads as described here above in the prior art documents and which have a limited length compared to the total length of the rod. The flexible main body according to the present invention does constitute at least 95% of the total rod length, more particularly at least 85% of the total rod length (excluding the max 5% of the front end, more particularly max 15% of the front end).

Advantageously, the conduit has a length, and the defined configuration of the conduit comprises at least its length to define the bending stiffness arrangement of the main body. In this case, embodiments of the invention enables a reduction of the friction in regard to the length of the conduit.

Advantageously, in addition, or as an alternative, the conduit has bends and/or junctions, and the defined configuration of the conduit comprises at least its number, and/or kinds (bend radii, angles), of bends and/or junctions to define the bending stiffness arrangement of the main body. In this case, the bends and/or junctions to pass by the duct rod along its insertion in the conduit are also considered to define the appropriate bending stiffness of the main body in order to have a reduction of friction.

Advantageously, the bending stiffness arrangement is defined in relation to a bend of the conduit with the formula:

$$B \geq \frac{14\left(D_d - D_c + \frac{\alpha^2}{8}R_b\right)^2}{\alpha^2} P_F;$$

wherein B is the bending stiffness (in Nm$^2$), $D_d$ is the inner diameter of the conduit (in m), $D_c$ is the diameter of the rod (in m), $R_b$ is the bend radius of the bend (in m) and $\alpha$ is the angle (in radians) of the local bend and $P_F$ is the local pushing force applied to the rod (in N). This formula allows to define a precise bending stiffness of the rod (i.e. this value or just a little higher by 5%-10%). The pushing force $P_F$ can be found experimentally at the insertion side of the conduit. For a uniform trajectory, i.e. constant undulations or bends, the force on the cable at a certain point on the rod will "travel with the rod". This means that the force measured on the rod at the insertion side is a good measure for the force for the same point on the rod when this point has a position further in the conduit. For finding the "best rod" the above equation may be rewritten as:

$$P_F \leq \frac{\alpha^2}{14\left(D_d - D_c + \frac{\alpha^2}{8}R_b\right)^2} B$$

An alternative to determine the pushing force $P_F$ is the use of simulation software, to calculate the pushing force $P_F$ without any measurement.

Advantageously, the defined configuration of the conduit comprises undulations with amplitude A and period P, and the bending stiffness arrangement is defined in relation to the undulations of the conduit with the formulas:

$$B \geq \frac{14\left(D_d - D_c + \frac{\alpha^2}{8}R_b\right)^2}{\alpha^2} P_F;$$

$$R_b = \frac{(\pi - 2)P^2}{4\pi^2 A};$$

$$\alpha = \frac{4\pi A}{P};$$

wherein B is the bending stiffness (in Nm$^2$), A is the amplitude of the undulations (in m), P is the period of the undulations (in m), $D_d$ is the inner diameter of the conduit (in m), $D_c$ is the diameter of the rod (in m), $R_b$ is the bend radius of the bend (in m) and α is the angle of the local bend (in radians) and $P_F$ is the local pushing force applied to the rod (in N).

Advantageously, the flexible main body has a first end to be first introduced into the conduit, and there is at least one first point located on the main body at a first distance from the first end and there is at least one second point located on the main body at a second distance from the first end, the second distance being greater than the first distance and the bending stiffness of the flexible main body at the second point being greater than the bending stiffness at the first point. This embodiment takes into account the length of the conduit and the stiffness of the main body close to the pushing end (i.e. the entry of the conduit) is increased to allow the transmittance of the pushing force with limited undulations of the main body in the conduit.

Advantageously, the main body comprises at least a first and a second elongated part being disconnectable, with the first elongated part to be first introduced into the conduit, the bending stiffness of the second elongated part being greater than the bending stiffness of the first elongated part. This particular embodiment allows a quick assembly of the rod according to embodiments of the present invention on-site with competitive costs to manufacture the different parts constituting the main body. It also enables set up directly on site of the system configuration by choosing the correct bending stiffness of each part.

Advantageously, the duct rod system comprises a sleeve able to be introduced into the conduit and covering at least one portion of the main body of the rod. This sleeve is aimed to be introduced in the duct and will enable a reduction of friction between the conduit and the rod, as the rod will contact only the sleeve all along the inserted length of the sleeve in the conduit.

Advantageously, the friction factor between the sleeve and the flexible main body is lower than 0.1. The sleeve enables a significant reduction of the friction all along its length. Once the sleeve is pushed in the conduit, the main body will meet a lowered resistance to its pushing as the friction between the main body and the sleeve will be less than 0.1.

Alternatively or in addition, when bended, the main body has a reaction moment in a portion where the main body is bended, and the reaction moment of the main body is lowered in the portion where the main body is bended. This embodiment specifically reduces the required pushing force to pass the bends, thus the friction due to undulations is decreased. The reaction moment being lowered, normal forces on the conduit from the bended main body inducing friction forces will be lowered in a similar ratio, resulting in low friction forces.

Advantageously, the main body has a cross section with an area moment of inertia, and the bending stiffness is lowered by a reduction of the area moment of inertia in the portion where the main body is bended. Lowering the bending stiffness is achieved easily by a specific reduction of the moment of inertia which is governing the reaction moment, the latter being accordingly reduced.

Advantageously, the main body has a cross sectional shape and the cross sectional shape is concavo-convex. This concavo convex cross sectional shape is easy to manufacture and achieves a significant reduction of the reaction moment in the bends, lowering consequently the friction of the rod in the aforementioned bends.

Advantageously, the sides of the main body are equipped with circular rods. This permits to soften the contact of the main body with the conduit and allows transporting trough these circular rods fluids or electricity to the head of the duct rod.

Advantageously, the main body comprises an attachment device located at the first end to be first introduced into the conduit. This equipment facilitates the attachment of the cable or optical fiber to be pulled back in the conduit by the rod.

Advantageously, the attachment device is detachable from the main body. This characteristic improves the adaptability of the system.

Advantageously, the duct rod system comprises pigs to be installed along the length of the main body, to apply on the rod a pulling force from a fluid flow created in the conduit. This combination allows increasing the length that can be pushed in the conduit.

Advantageously, the length of the main body is greater than 20 meters. This embodiment is particularly interesting for long conduits.

BRIEF DESCRIPTION OF THE DRAWINGS

Other characteristics and advantages of the present invention will appear more clearly from the following detailed description of particular non-limitative examples of the invention, illustrated by the appended drawings where.

DETAILED DESCRIPTION

Figure 1:
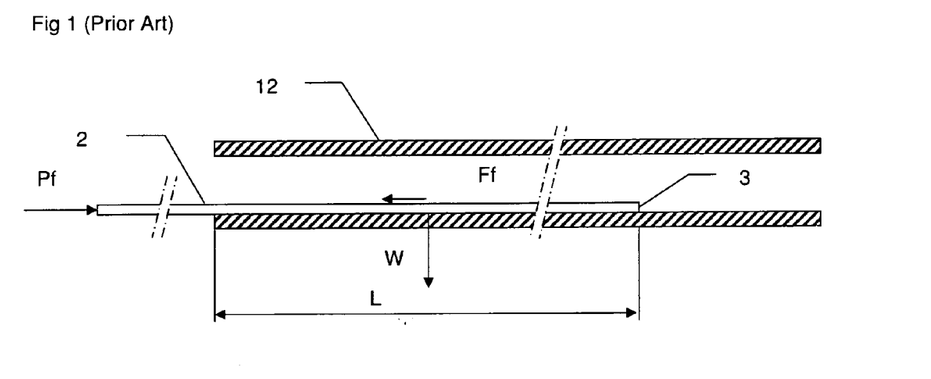
FIG. 1 represents a conventional duct rod pushed in a conduit, according to the state of the art.

FIG. 1 presents the common situation when a rod is pushed into a duct. A Pushing force Pf is applied to the rod 2 at the entry of the conduit 12. Depending on the weight W of the rod 2, a friction force Ff acts against the movement of the rod 2 and is characterized the formula Ff=f·W, where f stands for the coefficient of friction. It should be understood that the friction force increases with the inserted length of the rod. When a rod of length l is subjected to a pushing force Pf it will buckle (Euler's criterion) when this force reaches the value Pf=(AEI)/l², where A is a constant, E is the Young's modulus and I the area moment of inertia. In what follows, B=EI will be called the bending stiffness B (units N·m²). When buckling occurs, the rod 2 will contact the conduit 12 and will not further collapse because of the confined space. Therefore it is better to speak about undulation than about buckling.

Figure 2:
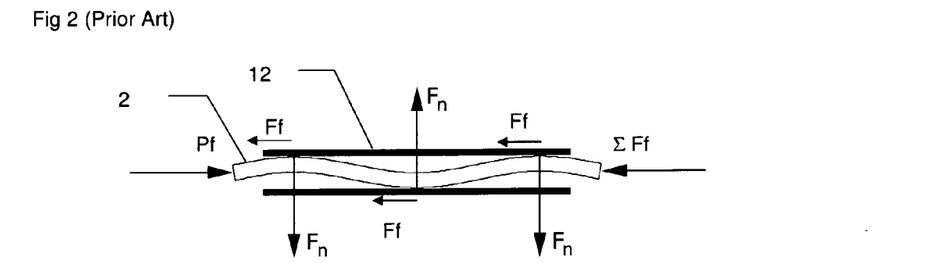
FIG. 2 represents typical undulations in a rod described at FIG. 1.

FIG. 2 represents typical undulations of a portion of a conventional long rod 2 inserted in a conduit 12. At each undulation, an extra friction force between the conduit 12 and the rod 2 is generated so that the represented portion of the rod 2 is pushed with a pushing force Pf to enter the conduit 12 and at the opposite, the sum Ff of the friction forces acts against the movement of the rod 2. The undulation period is typically much shorter than the rod length, so the rod 2 will form a "train" of undulations in the duct 12. When pushing a rod 2 over a length L, with a force Pf at the insertion end, a "train" of undulations is formed with decreasing period when going backwards, where the forces are higher. The higher the pushing force, the shorter the induced undulation periods of the rod inside the conduit, leading to increased friction forces, and above a certain critical limit even rendering impossible any further movement of the rod inside the duct. At this limit the increase in friction force becomes higher than the increase in pushing force.

Figure 3:
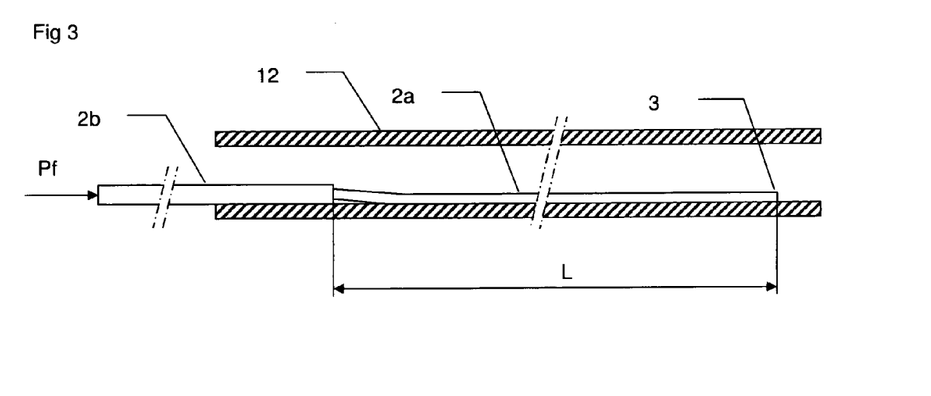
FIG. 3 represents a duct rod according to an embodiment of the present invention pushed in a duct.

FIG. 3 represents a duct rod according to an embodiment of the invention. As explained here-above, the undulation period depends on the bending stiffness. The duct rod portion 2a is inserted into the duct 12 with a pushing force Pf such that the induced undulation period of the rod 2a will not be too short, limiting the friction, and then duct rod portion 2a is connected to a duct rod portion 2b which has a greater bending stiffness than duct rod portion 2a and which is at its turn inserted into the conduit. As a result, any risk of too short an undulation period is avoided, reducing the friction. Duct rod portion 2b may have a greater bending stiffness either if its Young's modulus is increased by changing its material, or if its area moment of inertia is increased by changing its cross section for example. The use of this bending stiffness arrangement helps to avoid too short of undulation periods of the duct rod portion 2a inside the conduit 12 so that the friction force is reduced to the lowest limit.

Figure 4:
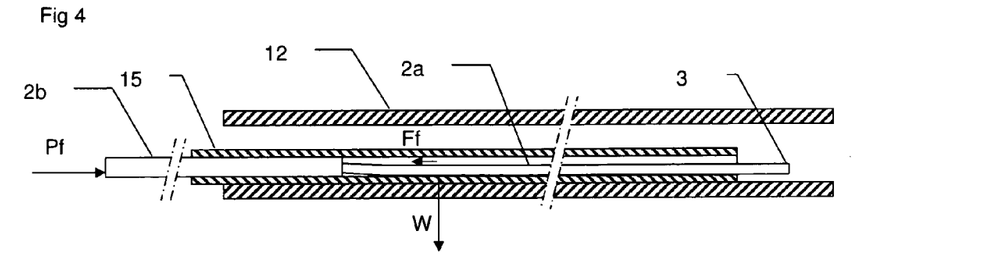
FIG. 4 represents duct rod according to an alternative embodiment of the invention pushed in a duct.

The FIG. 4 represents an improvement of the duct rod system presented at FIG. 3. It consists in covering a portion of the duct rod 2a, 2b by a sleeve 15. The sleeve 15 is introduced simultaneously with a first end 3 of the rod 2a, 2b so as to be first introduced into the conduit 12. At this step, there is no relative movement between the rod portion 2a, rod portion 2b and the sleeve 15, as it is only the sleeve 15 which is rubbing against the conduit 12 during the sliding. Once the sleeve 15 is completely inserted into the conduit 12, it is stopped and maintained in place, and the rod portion 2a, rod portion 2b are still pushed so that a relative movement between the rod portion 2a, rod portion 2b and sleeve 15 starts. The interest of using this sleeve 15 is that the material of sleeve can be chosen to offer a lower friction ratio between sleeve 15 and rod portion 2a, rod portion 2b than the friction ratio between conduit 12 and rod portion 2a, rod portion 2b. It is understood that in such a case, the friction force is lowered so that the undulation period is increased. The improvement by using the sleeve 15 is even more striking when a duct rod is inserted into a conduit that is occupied with (a) resident cable(s). Once the sleeve is inserted, the duct rod will no longer suffer from further increased friction caused by the wedge between the resident cable(s) and the conduit wall.

Figure 5:
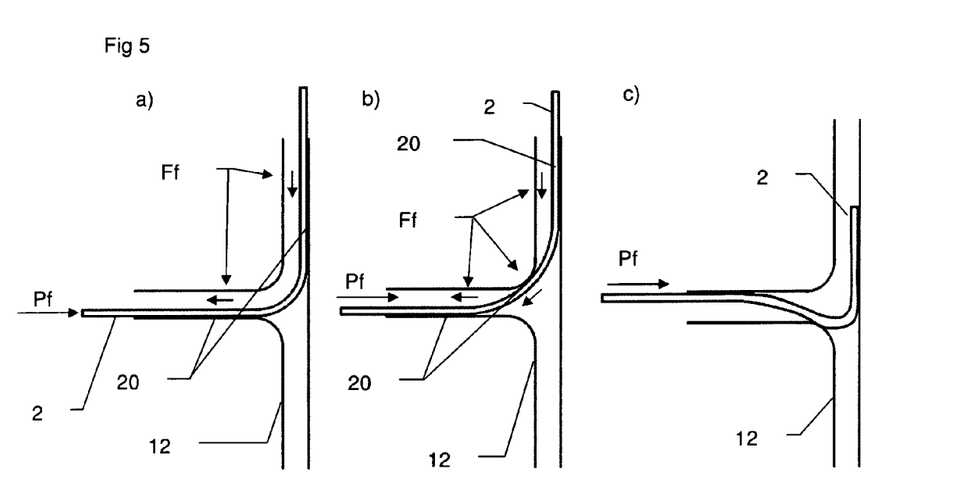
FIG. 5 illustrates different rods passing a bend or a junction in a conduit.

FIG. 5 represents different cases of a rod 2 passing a bend or a junction of the conduit 12.

In case a), the rod 2 inserted in the conduit 12 with a pushing force Pf has a close to optimized bending stiffness and then contacts the conduit 12 at two places 20 in the bending area. Since the rod 2 is in flexion, its bending stiffness creates normal forces normal to the conduit walls at the contact points 20 and friction forces Ff are created at each contact point 20, acting against the movement of the rod 2 into the conduit 12. Here the friction force is solely resulting from the direct reaction of the pushing force.

In case b), the rod 2 inserted into the conduit 12 with a pushing force Pf has a bending stiffness usually too high and as a result contacts the conduit 12 at three contact points 20 in the bending area. At each contact point 20, the bending stiffness makes the rod apply a normal reaction force to the conduit 12 and friction forces Ff appear and act against the movement of the rod in the conduit. The sum of these three resulting friction forces is of course greater than the sum of the two friction forces acting in case a). Here, besides the reaction from the pushing force, also a force resulting from the bending stiffness is adding to the friction.

In case c), the pushed rod 2 has a bending stiffness too low and has not enough rigidity to correctly pass the bend. Its bending stiffness is not sufficient to prevent the rod from being pushed onto the wall of the conduit 12. In this situation, the rod 2 will buttress onto the wall and the associated friction force will inhibit any further movement of the rod 2 into the conduit 12, or at least increasing the friction forces further.

From those cases a), b) and c), it is understood that an appropriate bending stiffness will ensure that passing bends is done with reduced and optimized friction forces. The preferred situation is the transition from situation b) to situation a), when the rod 2 has just not become loose from the inner wall of the bend. In situation a) there is no contribution from the bending stiffness to the friction. So, as long as this situation applies, the straight section benefits from increasing bending stiffness, without a penalty for extra friction in the bend. When, in case of increasing the bending stiffness, the rod starts to touch the inner wall of the bend, the penalty in the bend starts to count, but the benefit in the straight section is at first still dominating. When increasing the bending stiffness further the penalty in the bends will prevail. The best bending stiffness is a balance between the effects in the straight and bent parts of the conduit and depends on the trajectory.

Figure 6:
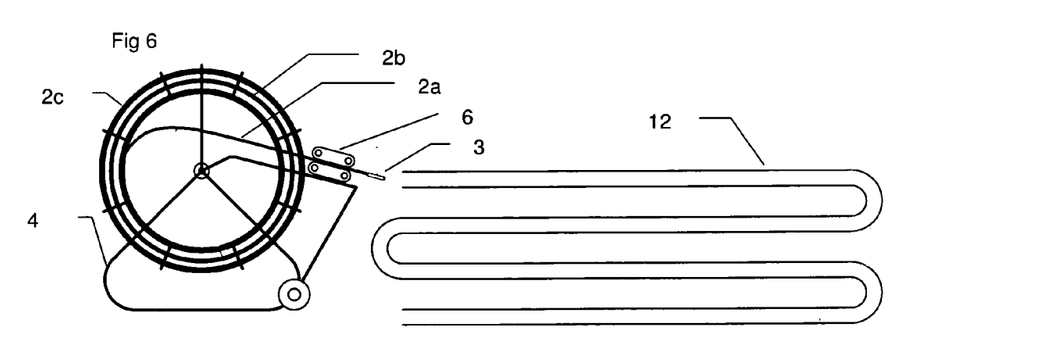
FIG. 6 illustrates a duct rod system to be inserted in a conduit.

FIG. 6 presents a duct rod system according to an embodiment of the invention to be inserted into a conduit 12. The rod 2a has a first end 3 to be first introduced into the conduit 12 with the help of a pushing device 6 which can be caterpillars for example. In view of the length of the conduit 12, it is determined that the rod 2a should be connected to a rod 2b having a greater bending stiffness and further connected to a rod 2c having a further greater bending stiffness. For an easy installation of the rods 2a, 2b, 2c, they are coiled onto a coil device 4.

Figure 7:
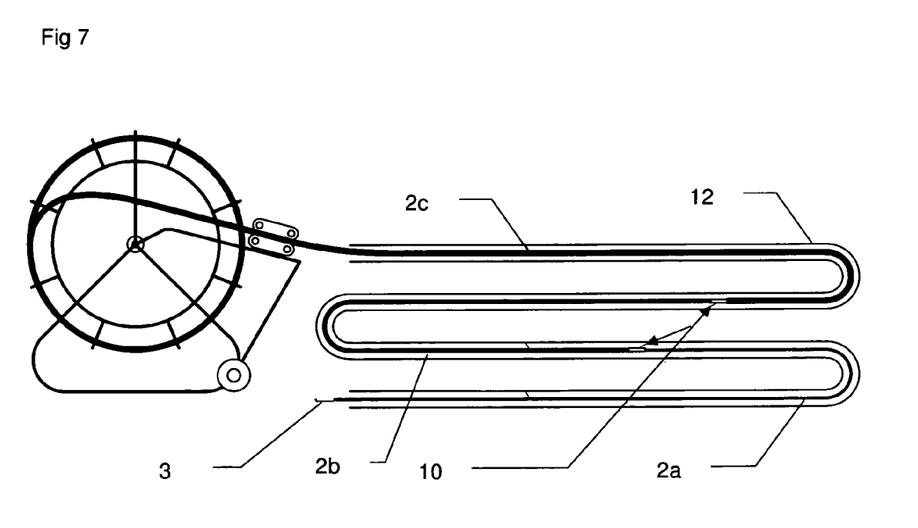
FIG. 7 illustrates the duct rod system of FIG. 6 inserted in a conduit.

FIG. 7 represents the duct rod system presented at FIG. 6 once the rods 2a, 2b, 2c have been pushed through the entire conduit 12. The first end 3 of the rod 2a has reached the exit of the conduit 12. When the pushing force gets higher and risks causing undulations of rod 2a, the latter is connected, using a connection device 10, to a more rigid rod 2b, having a greater bending stiffness, in order to limit excessive undulations of the rod that would result in excessive friction. Considering the rod 2b, once again when the pushing force gets higher and risks causing undulations of rod 2b, it is connected to an again more rigid rod 2c, which has an increased bending stiffness. The points were the rods are connected to more rigid rods are also ruled by the stiffness effects of the rod in bends and junctions in the trajectory, such that the best compromise for the friction is obtained. With this invention, the maximum length of the conduit in which a rod can be pushed is increased compared to a rod having the same stiffness all along its main body.

Figure 8:
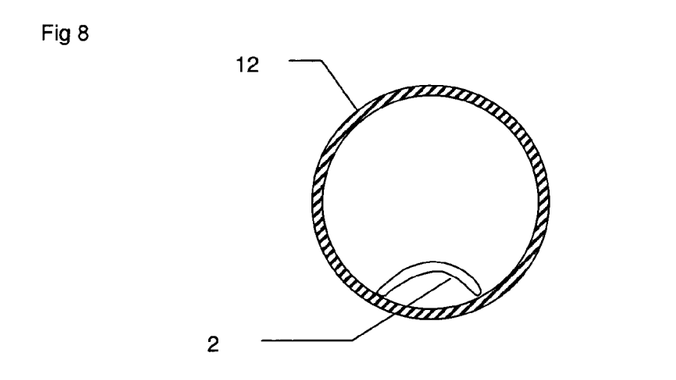
FIG. 8 represents a duct rod according to an embodiment of the present invention with a specific cross section.

FIG. 8 represents a duct rod 2 inserted in a conduit 12, having a concavo-convex cross sectional shape, to minimize the friction force in the bends of the conduit. This particular cross sectional shape has the property of being deformed in a bend so that its area moment of inertia is significantly reduced, resulting in a reduced flexion moment of reaction. The reaction forces of the rod 2 on the conduit walls will be severely reduced and the induced friction forces will consequently be proportionally decreased. It is assumed that the area moment of inertia is decreased by 30% minimum in the bends of a conduit with such an embodiment.

Coming back to the formula that gives the pushing force in relation to the characteristics of the rod (bending stiffness and diameter) and the characteristics of the conduit (diameter and bends), some calculations may be shown:

$$B \geq \frac{14\left(D_d - D_c + \frac{\alpha^2}{8}R_b\right)^2}{\alpha^2} P_F;$$

wherein B is the bending stiffness (in Nm$^2$), $D_d$ is the inner diameter of the conduit (in m), $D_c$ is the diameter of the rod (in m), $R_b$ is the bend radius of the bend (in m) and $\alpha$ is the angle (in radians) of the local bend and $P_F$ is the local pushing force applied to the rod (in N).

Firstly, the following system is considered: a conduit having an inner diameter of 26 mm, bends of 90° ($\pi/2$), and a rod having a diameter of 9 mm is pushed with a force of 34N (determined either experimentally or with a simulation software), then the optimum bending stiffness of the rod, found with the formula, is:

$$B \approx 5.7 \text{ Nm}^2$$

This value (i.e. this value or just little higher by 5%-10%) guaranties that the local stiffness of the rod is such that it just gets loose from the inner curve of the bends in the duct (situation between FIG. 5a and FIG. 5b).

Alternatively, the same conduit is considered, but three rods are successively inserted, with the following characteristics:

Rod 1: diameter 6.5 mm, stiffness 1.0 Nm$^2$
Rod 2: diameter 9 mm, stiffness 5.7 Nm$^2$
Rod 3: diameter 11 mm, stiffness 10.1 Nm$^2$ The formula that gives the pushing force in relation with the bending stiffness is used:

$$P_F \leq \frac{\alpha^2}{14\left(D_d - D_c + \frac{\alpha^2}{8}R_b\right)^2} B$$

It is found that first Rod 1 can be pushed inside until a force of 6 N, then rod 2 is pushed, until a force of 34 N, and finally rod 3 is pushed, it is still in its optimum until a pushing force of 62 N (i.e. these values or just a little less by 5%-10%). It could be replaced then by an even stiffer rod.

The last case could be that instead of bends the duct only shows windings, with amplitude A of 20 cm and period P of 4 m.

The hereunder formulas are used to determine the maximum pushing force of each rod as defined above:

$$P_F \leq \frac{\alpha^2}{14\left(D_d - D_c + \frac{\alpha^2}{8}R_b\right)^2} B$$

With:

$$R_b = \frac{(\pi - 2)P^2}{4\pi^2 A}$$

$$\alpha \approx \frac{4\pi A}{P}$$

wherein B is the bending stiffness (in Nm$^2$), A is the amplitude of the undulations (in m), P is the period of the undulations (in m), $D_d$ is the inner diameter of the conduit (in m), $D_c$ is the diameter of the rod (in m), $R_b$ is the bend radius of the bend (in m) and $\alpha$ is the angle of the local bend (in radians) and $P_F$ is the local pushing force applied to the rod (in N).

It is found that the undulations are equivalent to bends with bend radius of 2.31 m and angle of 36°.

Then, first rod 1 may be pushed inside until a force of 2 N, then rod 2 is pushed, until a force of 9 N, and finally rod 3 is pushed, it is still in its optimum until a pushing force of 17 N (i.e. these values or just a little less). It could be replaced then by an even stiffer rod.

It is understood that obvious improvements and/or modifications for one skilled in the art maybe implemented and being under the scope of the invention as it is defined by the appended claims.

The invention claimed is:
1. A method of optimizing a bending stiffness of a duct rod with regard to a specific configuration of a conduit, the method comprising:
   determining a defined configuration of a conduit, wherein the defined configuration comprises at least the number and/or kinds of bends and/or junctions of the conduit;
   determining a bending stiffness of at least one rod having a flexible main body, wherein the flexible main body has a bending stiffness arrangement defined in relation to the number and/or kinds of bends and/or junctions of the conduit according to the formula:

$$B \geq \frac{14\left(D_d - D_c + \frac{\alpha^2}{8}R_b\right)^2}{\alpha^2} P_F;$$

wherein B is the bending stiffness, $D_d$ is the inner diameter of the conduit, $D_c$ is the diameter of the rod, $R_b$ is the bend radius of the bend and a is the angle of the bend and $P_F$ is the local pushing force applied to the rod; and
   feeding the at least one rod with a bending stiffness substantially equal to the determined bending stiffness into said conduit.

2. The method of claim 1, wherein the conduit has a length and the defined configuration of the conduit comprises at least its length to define the bending stiffness arrangement of the flexible main body.

3. The method of claim 1, wherein the flexible main body comprises at least a first and a second elongated part being disconnectable, with the first elongated part to be first introduced into the conduit, the bending stiffness of the second elongated part being greater than the bending stiffness of the first elongated part.

4. The method of claim 1, wherein the at least one rod comprises a sleeve configured to be introduced into the conduit and cover at least one portion of the flexible main body.

5. The method of claim 4, wherein a friction factor between the sleeve and the flexible main body is lower than 0.1.

6. The method of claim 1, wherein when bent, the flexible main body has a reaction moment in a portion where the flexible main body is bent, wherein the reaction moment of the flexible main body is lowered in the portion where the flexible main body is bent.

7. The method of claim 6, wherein the flexible main body has a cross section with an area moment of inertia, wherein the bending stiffness is lowered by a reduction of the area moment of inertia in the portion where the main body is bent.

8. The method of claim 6, wherein the flexible main body has a cross sectional shape and wherein the cross sectional shape is concavo-convex.

9. The method of claim 8, wherein the sides of the flexible main body are equipped with circular rods.

10. The method of claim 1, wherein the flexible main body comprises an attachment device located at a first end to be first introduced into the conduit.

11. The method of claim 10, wherein the attachment device is detachable from the main body.

12. The method of claim 1, wherein the at least one rod comprises pigs to be installed along the length of the flexible main body, to apply on the rod a pulling force from a fluid flow created in the conduit.

13. The method of claim 1, wherein the length of the flexible main body is greater than 20 meters.

14. The method of claim 1, wherein the flexible main body has a first end to be first introduced into the conduit, wherein there is at least one first point located on the flexible main body at a first distance from the first end and in that there is at least one second point located on the flexible main body at a second distance from the first end, the second distance being greater than said first distance and the bending stiffness of the flexible main body at the second point being greater than the bending stiffness at the first point.

15. A duct rod system having a duct rod with a bending stiffness optimized according to the method of claim 1.

16. A method of optimizing a bending stiffness of a duct rod with regard to a specific configuration of a conduit, the method comprising:
   determining a defined configuration of a conduit, wherein the defined configuration comprises at least the number and/or kinds of bends and/or junctions, and undulations with amplitude A and period P of the conduit;
   determining a bending stiffness of at least one rod having a flexible main body, wherein the flexible main body has a bending stiffness arrangement defined in relation to the number and/or kinds of bends and/or junctions, and undulations with amplitude A and period P of the conduit according to the formulas:

$$B \geq \frac{14\left(D_d - D_c + \frac{\alpha^2}{8}R_b\right)^2}{\alpha^2} P_F;$$

$$R_b = \frac{(\pi - 2)P^2}{4\pi^2 A};$$

$$\alpha = \frac{4\pi A}{P};$$

wherein B is the bending stiffness, A is the amplitude of the undulations, P is the period of the undulations, $D_d$ is the inner diameter of the conduit, $D_c$ is the diameter of the rod, $R_b$ is the bend radius of the bend and a is the angle of the bend and $P_F$ is the local pushing force applied to the rod; and
   feeding the at least one duct rod with a bending stiffness substantially equal to the determined bending stiffness into said conduit.

17. The method of claim 16, wherein the conduit has a length and the defined configuration of the conduit comprises at least its length to define the bending stiffness arrangement of the flexible main body.

18. The method of claim 16, wherein the flexible main body comprises at least a first and a second elongated part being disconnectable, with the first elongated part to be first introduced into the conduit, the bending stiffness of the second elongated part being greater than the bending stiffness of the first elongated part.

19. The method of claim 16, wherein the at least one rod comprises a sleeve configured to be introduced into the conduit and cover at least one portion of the flexible main body.

20. The method of claim 19, wherein a friction factor between the sleeve and the flexible main body is lower than 0.1.

21. The method of claim 16, wherein when bent, the flexible main body has a reaction moment in a portion where the flexible main body is bent, wherein the reaction moment of the flexible main body is lowered in the portion where the flexible main body is bent.

22. The method of claim 21, wherein the flexible main body has a cross section with an area moment of inertia, wherein the bending stiffness is lowered by a reduction of the area moment of inertia in the portion where the main body is bent.

23. The method of claim 21, wherein the flexible main body has a cross sectional shape and wherein the cross sectional shape is concavo-convex.

24. The method of claim 23, wherein the sides of the flexible main body are equipped with circular rods.

25. The method of claim 16, wherein the flexible main body comprises an attachment device located at a first end to be first introduced into the conduit.

26. The method of claim 25, wherein the attachment device is detachable from the main body.

27. The method of claim 16, wherein the at least one rod comprises pigs to be installed along the length of the flexible main body, to apply on the rod a pulling force from a fluid flow created in the conduit.

28. The method of claim 16, wherein the length of the flexible main body is greater than 20 meters.

29. The method of claim 16, wherein the flexible main body has a first end to be first introduced into the conduit, wherein there is at least one first point located on the flexible main body at a first distance from the first end and in that there is at least one second point located on the flexible main body at a second distance from the first end, the second distance being greater than said first distance and the bending stiffness of the flexible main body at the second point being greater than the bending stiffness at the first point.

30. A duct rod system having a duct rod with a bending stiffness optimized according to the method of claim 16.

* * * * *

UNITED STATES PATENT AND TRADEMARK OFFICE
CERTIFICATE OF CORRECTION

PATENT NO.       : 9,780,540 B2
APPLICATION NO.  : 13/885626
DATED            : October 3, 2017
INVENTOR(S)      : Griffioen Page 1 of 1

It is certified that error appears in the above-identified patent and that said Letters Patent is hereby corrected as shown below:

In the Claims

Column 9, Line 21, Claim 1:
After "and" delete "a" and insert -- α --.

Column 10, Line 42, Claim 16:
After "and" delete "a" and insert -- α --.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*